Sept. 27, 1949.  L. REICHOLD  2,483,104
FILTER FOR COFFEE MAKERS
Filed March 28, 1945
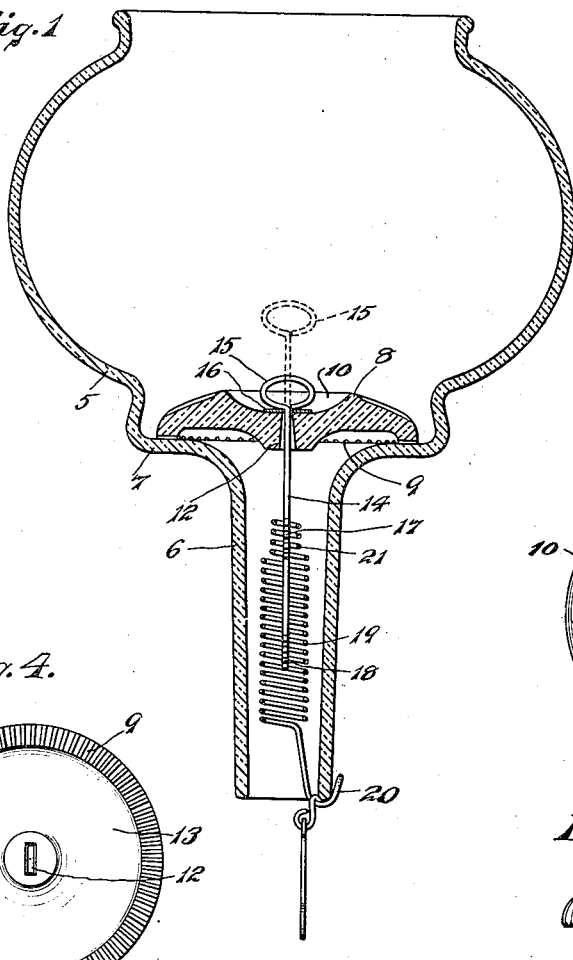
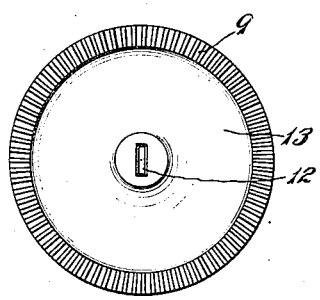
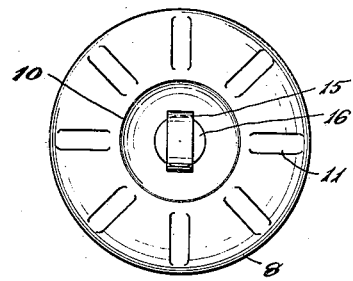
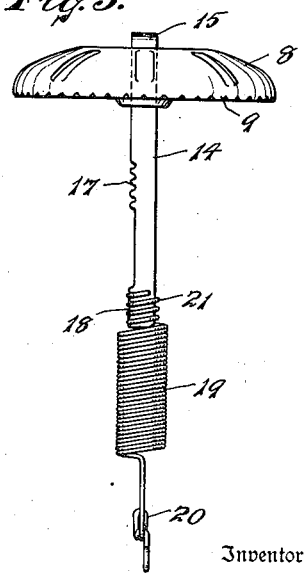
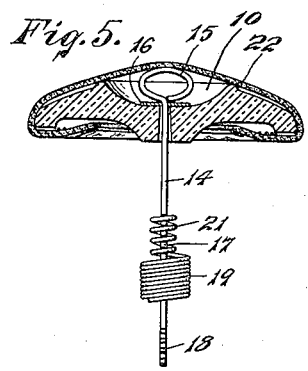
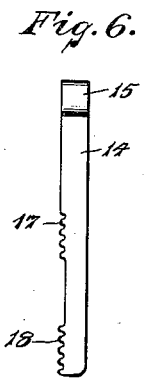
Inventor
LUDWIG REICHOLD.
Louis V. Lucia
Attorney Patented Sept. 27, 1949

2,483,104

UNITED STATES PATENT OFFICE 2,483,104

FILTER FOR COFFEE MAKERS

Ludwig Reichold, Winsted, Conn., assignor to The Silex Company, Hartford, Conn., a corporation of Connecticut Application March 28, 1945, Serial No. 585,276

3 Claims. (Cl. 210—162)

This invention relates to filters for coffee makers and more particularly for coffee makers of the vacuum type which generally comprise a lower bowl having an upper bowl mounted thereon with a stem depending from the upper into the lower bowl. The filter, for which my invention is intended, is positioned above said stem.

When water is heated in the lower bowl, it is forced upwardly through the stem into the upper bowl where it is infused with coffee grounds therein. The lower bowl is then permitted to cool and a vacuum is created therein which will draw the infusion from the upper bowl back into the lower bowl; the filter serving to filter the resulting brew by preventing the coffee grounds from passing into the lower bowl with the liquid.

Although various types of such filters have been produced, it has been found that those which are secured in position and retained therein by suitable spring means are the most desirable since they produce more uniform results through their operation and the coffee is of a uniform quality.

The spring for retaining said filter in position is usually anchored to the bottom of the stem of the upper bowl and since different models of coffee makers have stems of different lengths, it is desired that a spring be provided which can be adjusted for the different length stems without unduly changing the tension of the spring.

It is an object of this invention, therefore, to provide a coffee maker filter having novel and efficient means for adjusting the anchoring spring thereof to accommodate upper bowl stems of different lengths.

A further object of this invention is to provide a novel filter which can be used with or without a cloth strainer.

Further objects and advantages of this invention will be more clearly understood from the following description and accompanying drawings in which:

Fig. 1 is a view in central vertical section showing an upper bowl of a coffee maker with my improved filter attached thereto.

Fig. 2 is a plan view of said filter.

Fig. 3 is a side elevational view thereof.

Fig. 4 is a bottom view of the filter disc.

Fig. 5 is a side view partly in vertical section showing the use of a cloth strainer over the filter disc.

Fig. 6 is a side elevational view of the spring securing bar.

As shown in the drawings, the numeral 5 denotes an upper bowl such as used in conventional coffee makers of the vacuum type. The said bowls are usually provided with a stem 6 which depends from the bottom 7 thereof into a lower bowl, not shown. My improved filter may consist of a disc-shaped plate 8 having an annular bottom surface 9 preferably provided with radially extending ribs and serrations thereon. The top of said member is provided with a recess 10 and an aperture 12 extends from the bottom of the recess 10 through said disc. Radially extending grooves 11 are also provided in the top surface of said disc. The bottom of the disc-shaped member has an inverted recess 13 for the purpose to be hereinafter described.

An attachment bar 14 is slidably mounted in the disc 8 and extends downwardly therefrom through the aperture 12. The upper end of said bar is formed with a loop to provide a suitable handle and a washer 16 is provided below said loop to prevent the passage of coffee grounds or sediment through the aperture 12.

The said bar 14 has upper and a lower set of threads, or teeth 17 and 18, for engaging the coil spring 19 which depends from said bar 14 and has a hook 20 extending from the bottom thereof to engage the edge of the stem 6 and thereby anchor the filter disc 8 in position so as to prevent the passage of coffee grounds from the upper bowl into the lower bowl, while still permitting the passage of liquid through the grooves in the surface 9.

The said spring is constructed with the proper tension to permit the disc to rise under pressure of the liquid, as it passes from the lower into the upper bowl, but to also firmly retain the filtering disc in position as the liquid is returning from the upper into the lower bowl.

As the said stems 6 vary in length for different makes and types of said coffee makers, it is desirable that the spring be adjustable on the bar 14 to accommodate the different lengths of stems without requiring a spring of undue length which would provide too little tension for the disc 8 when used on a short stem and too much tension when used on a long stem.

I therefore provide, on said spring 19, a portion 21 consisting of a plurality of turns of lesser diameter than the body of the spring 19. The diameter of said portion 21 being such that the turns thereof may be threaded to either of the series of teeth 17 or 18, depending upon whether the filter is to be used in an upper bowl having a long or short stem.

As illustrated in Fig. 1, the spring 19 is attached to the upper set of teeth 17 on the bar 14 to accommodate the short stem 6. In Fig. 3, the said spring is shown as being attached to the lower set of teeth 18 so as to accommodate a longer stem. It will be understood that, by simply turning the spring, the reduced portion 21 thereof may be threaded to either the set of teeth 18 or the set 17, thereby rendering it possible to use a spring of minimum length and still accommodate a wide variation of stem lengths without greatly changing the tension with which the filter disc 8 is retained against the bottom 7 of the coffee maker bowl 5.

As shown in dotted lines in Fig. 1, the bar 14 may be used as an extendable handle, in lowering the disc 8 to its position through the opening in the top bowl 5, by simply grasping the loop 15, prior to placing the filter in the upper bowl, and permitting the said disc to slip downwardly on the bar 14 and rest upon the coil portion of the spring. After the disc 8 has been placed upon the bottom of the bowl, the said handle is released and the bar 14 will slide into its normal position by gravity and the spring may then be readily attached to the bottom of the stem by means of the hooks 20.

As shown in Fig. 5, a cloth strainer 22 of conventional form may be placed over the filter disc 8 when it is desired to produce finished coffee that is of a higher purity than that which can be produced through a filter without a cloth strainer. The said strainer is placed over the stem so that it is supported in the center by the loop 15 and filtration will take place through the material of said strainer between the lower surface 9 and the surface of the bottom 7 of the bowl; thus preventing the passage of even fine coffee grounds or sediment with the coffee brew as it passes from the upper bowl into the lower bowl of the coffee maker.

It will be noted that the sets of teeth 17 and 18 are spaced from each other. This is to permit changing of the spring from one position to another on the attachment bar 14 without requiring continued rotation of the spring. However, if closer adjustment is desired, the teeth may be continuous.

I claim:

1. For a coffee maker of the character described having a stem depending therefrom, a filtering device comprising a disc-shaped member having an aperture extending therethrough, a bar extending through said aperture and slidably secured to said disc-shaped member, said bar having an abutment for securing the same to said disc-shaped member, teeth in the edge of said bar, a wire spring for resiliently anchoring said member in filtering position, a hook depending from the said spring for anchoring the same to the bottom of said stem, and a plurality of turns on said spring adapted to be engaged with said teeth for adjustably securing the spring to the bar to accommodate stems of different lengths.

2. For a coffee maker of the character described comprising a disc-shaped member having an annular bottom surface with a series of grooves extending radially thereon and permitting filtration therethrough; the said member having a recess in the top thereof and an aperture extending vertically from said recess through said member, a bar slidably extending through said recess, a handle portion on said bar fitting within said recess, a spring for anchoring said filter in position, and cooperating means on said spring and bar for adjustably securing the spring to the bar.

3. A filtering device of the character described comprising a filtering member, a bar vertically slidable in and depending from said member, a coil spring for anchoring said device in operable position, and means for securing said spring to said bar; said means comprising spaced sets of teeth projecting from the edge of said bar, and turns in said spring of lesser diameter than the remaining portion of the spring and adapted to be threaded to said teeth for adjustably securing the spring at different distances from the filtering member and permitting free movement of said turns over said bar between said sets of teeth.

LUDWIG REICHOLD.

REFERENCES CITED

The following references are of record in the file of this patent:

UNITED STATES PATENTS

| Number | Name | Date |
| --- | --- | --- |
| 1,006,886 | Spitzig | Oct. 24, 1911 |
| 1,157,778 | Hemming et al. | Oct. 26, 1915 |
| 1,634,705 | Bridges | July 5, 1927 |
| 1,731,698 | Anderson | Oct. 15, 1929 |
| 1,967,983 | Wolcott | July 24, 1934 |
| 2,234,678 | Matson | Mar. 11, 1941 |
| 2,236,254 | Brault | June 16, 1942 |
| 2,370,674 | Lucia | Mar. 6, 1945 |
| 2,388,335 | McCullough | Nov. 6, 1945 |

FOREIGN PATENTS

| Number | Country | Date |
| --- | --- | --- |
| 401,322 | Great Britain | Nov. 7, 1933 |